US008080311B2

(12) United States Patent  
Anderson

(10) Patent No.: US 8,080,311 B2  
(45) Date of Patent: Dec. 20, 2011

(54) SAFETY GLAZINGS WITH IMPROVED WEATHERABILITY

(75) Inventor: Jerrel C. Anderson, Vienna, WV (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 12/265,279

(22) Filed: Nov. 5, 2008

(65) Prior Publication Data

US 2010/0112343 A1   May 6, 2010

(51) Int. Cl.
*B32B 17/10* (2006.01)
*B32B 27/08* (2006.01)
*B32B 27/28* (2006.01)
*B32B 27/30* (2006.01)
*B32B 27/36* (2006.01)

(52) U.S. Cl. ........ 428/215; 428/212; 428/213; 428/216; 428/334; 428/335; 428/336; 428/339; 428/426; 428/441; 428/442; 428/446; 428/447; 428/476.3; 428/476.6; 428/478.2; 428/480; 428/483; 428/522

(58) Field of Classification Search .................. None
See application file for complete search history.

(56) References Cited

U.S. PATENT DOCUMENTS

| | | | |
|---|---|---|---|
| 2,491,023 A | 12/1949 | Alles et al. | |
| 2,627,088 A | 2/1953 | Alles et al. | |
| 2,698,235 A | 12/1954 | Swindells | |
| 2,698,240 A | 12/1954 | Alles et al. | |
| 2,799,684 A | 7/1957 | Morris | |
| 2,943,937 A | 7/1960 | Nadeau et al. | |
| 3,143,421 A | 8/1964 | Nadeau et al. | |
| 3,986,997 A | 10/1976 | Clark | |
| 4,027,073 A | 5/1977 | Clark | |
| 4,073,967 A | 2/1978 | Sandvig | |
| 4,082,896 A * | 4/1978 | Wegwerth | 428/413 |
| 4,177,315 A * | 12/1979 | Ubersax | 428/336 |
| 4,211,823 A | 7/1980 | Suzuki | |
| 4,350,622 A * | 9/1982 | Hiyoshi et al. | 524/831 |
| 4,355,135 A | 10/1982 | January | |
| 4,469,743 A * | 9/1984 | Hiss | 428/215 |
| 4,499,224 A | 2/1985 | Anthony | |
| 4,540,634 A | 9/1985 | Ashlock | |
| 4,799,954 A | 1/1989 | Hochberg | |
| 4,868,081 A | 9/1989 | Cairncross | |
| 4,898,786 A | 2/1990 | Swofford | |
| 4,925,737 A * | 5/1990 | Baba et al. | 428/437 |
| 4,954,396 A | 9/1990 | Swofford | |
| 5,069,942 A | 12/1991 | Anderson | |
| 5,145,744 A * | 9/1992 | Cartier et al. | 428/423.7 |
| 5,275,645 A | 1/1994 | Ternoir et al. | |
| 5,322,763 A | 6/1994 | Cairncross | |
| 5,342,658 A | 8/1994 | Hong et al. | |
| 5,516,456 A * | 5/1996 | Shinohara et al. | 252/299.01 |
| 5,567,529 A | 10/1996 | Smith | |
| 5,645,940 A * | 7/1997 | Teddington et al. | 428/430 |
| 5,698,619 A | 12/1997 | Cohen et al. | |
| 5,763,089 A * | 6/1998 | Chaussade et al. | 428/425.3 |
| 5,846,363 A * | 12/1998 | Haverkamp | 156/106 |
| 6,255,429 B1 | 7/2001 | Griffin et al. | |
| 6,432,191 B2 | 8/2002 | Schutt | |
| 6,480,250 B1 * | 11/2002 | Matsufuji et al. | 349/113 |
| 6,597,525 B2 * | 7/2003 | Kubota | 359/885 |
| 6,602,379 B2 | 8/2003 | Li et al. | |
| 6,660,388 B2 * | 12/2003 | Liu et al. | 428/421 |
| 6,686,031 B2 * | 2/2004 | Matsufuji et al. | 428/212 |
| 6,693,746 B1 * | 2/2004 | Nakamura et al. | 359/580 |
| 6,777,102 B2 * | 8/2004 | Sakurai et al. | 428/521 |
| 6,849,327 B1 * | 2/2005 | Ikuhara et al. | 428/339 |
| 6,926,945 B2 * | 8/2005 | Yano et al. | 428/141 |
| 7,005,176 B2 * | 2/2006 | Tojo et al. | 428/141 |
| 7,022,388 B2 * | 4/2006 | Hashimoto et al. | 428/34.9 |
| 7,026,035 B2 * | 4/2006 | Yano et al. | 428/141 |
| 7,189,457 B2 * | 3/2007 | Anderson | 428/423.1 |
| 7,524,900 B2 * | 4/2009 | Nishiura et al. | 525/192 |
| 2006/0234035 A1 * | 10/2006 | Wang et al. | 428/327 |
| 2007/0196629 A1 * | 8/2007 | Smith et al. | 428/195.1 |
| 2007/0272354 A9 | 11/2007 | Wang | |
| 2008/0032144 A1 | 2/2008 | Hashimoto et al. | |

FOREIGN PATENT DOCUMENTS

| | | |
|---|---|---|
| EP | 0100326 A1 | 2/1984 |
| EP | 0157030 B1 | 7/1989 |
| GB | 2044787 A | 10/1980 |
| JP | 02196693 | 8/1990 |
| JP | 06219046 A | 8/1994 |
| WO | 8001007 | 5/1980 |
| WO | 8304002 | 11/1983 |
| WO | 2005007763 A1 | 1/2005 |
| WO | WO 2007-005711 * | 1/2007 |

* cited by examiner

*Primary Examiner* — Vivian Chen
(74) *Attorney, Agent, or Firm* — Tong Li; Mark D. Kuller

(57) ABSTRACT

Disclosed is a polyester film having at least one surface coated with a poly(vinylidene chloride) layer and upon which an abrasion resistant hardcoat. Further disclosed is a laminated article comprising the hardcoated polyester film.

11 Claims, No Drawings

SAFETY GLAZINGS WITH IMPROVED WEATHERABILITY

FIELD OF THE DISCLOSURE

The invention relates to a safety laminate comprising a poly(vinylidene chloride) primed and hardcoated polyester film.

BACKGROUND OF THE DISCLOSURE

In the automotive industry, to provide adequate occupant protection in roll-overs and other types of accidents, glass/plastic laminates are often used as windshields, moon roofs, side windows, and rear windows. A typical glass/plastic laminate comprises a polymeric interlayer sheet sandwiched between a glass outer layer and a plastic film outer layer, and wherein the plastic film outer layer, which is facing the protected object, is often coated with a clear abrasion resistant hardcoat on its outside surface. When used as windows in an automobile, the glass/plastic laminates are secured into the window frames by adhesives, such as polyurethanes. In such a configuration, the plastic side of the laminate would be bonded to the window frame by a layer of adhesives (e.g., polyurethanes) between the abrasion resistant hardcoat and the window frame. Therefore adequate bonding between the plastic film and the hardcoat is required to prevent detachment of the glass/plastic laminate from the window frame. However, several prior art adhesives used between the plastic film and the hardcoat have been found inadequate to provide such a bonding after Cataplasma Exposure. There is a need for a new system to provide sufficient bonding between the plastic film and the abrasion resistant hardcoat.

SUMMARY OF THE DISCLOSURE

Disclosed herein is a hardcoated polyester film (such as a poly(ethylene terephthalate) film), which has at least one surface coated with a layer of a poly(vinylidene chloride) composition and over which an abrasion resistant hardcoat (such as a polysiloxane based hardcoat). Optionally, a layer of an organic colloid (such as a gelatin) is further deposited between the poly(vinylidene chloride) layer and the abrasion resistant hardcoat.

In one embodiment, the poly(vinylidene chloride) composition comprises a homopolymer of vinylidene chloride or a copolymer of vinylidene chloride and at least one polymerizable vinyl or vinylidene compound having a formula of

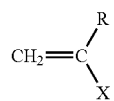

wherein, R is selected from the group consisting of —H, —COOR', —(CH$_2$)$_n$COOR' (n=1-5), an alkyl radical, a halogen and X is selected from the group consisting of a hydrocarbon radical, a halogen, —NO, —NO$_2$, —CN, —COOR, —SO$_3$H, —CONH$_2$, —CONHR', —CONR'$_2$,

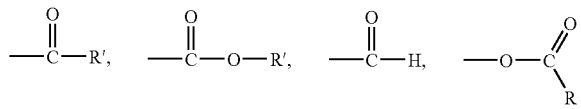

and —OR",
and wherein R' is an alkyl radical and R" is an alkyl or aryl radical.

Further disclosed herein is a laminated article comprising the hardcoated polyester film described above.

In one embodiment, the laminate article is a safety laminate, which comprises (a) the hardcoated polyester film, (b) at least one polymeric interlayer sheet laminated to the inside surface of the hardcoated polyester film, (c) n layers of rigid sheets or additional films, and (d) n–1 layers of additional polymeric interlayer sheets, wherein n is an integer of 1-10 and each pair of the adjacent rigid sheets or additional films are interspaced by one of the n–1 additional polymeric interlayer sheets.

Further disclosed herein is a safety laminate comprising (a) a first poly(ethylene terephthalate) film having an outside surface coated with a layer of a poly(vinylidene chloride) composition and over which a polysiloxane based abrasion resistant hardcoat, (b) a polymeric interlayer sheet comprising a poly(vinyl butyral) or an ionomer laminated to an inside surface of the first hardcoated poly(ethylene terephthalate) film. Optionally a layer of a gelatin is further deposited between the poly(vinylidene chloride) layer and the polysiloxane based abrasion resistant hardcoat.

DETAILED DESCRIPTION OF THE DISCLOSURE

Provided herein is a polyester film which has at least one surface coated with a layer of a poly(vinylidene chloride) composition and upon which an abrasion resistant hardcoat. Optionally, a layer of an organic colloid, capable of showing high viscosity characteristics and appreciable gelly strength, is further applied over the poly(vinylidene chloride) layer and under the abrasion resistant hardcoat.

Polyesters are derived from condensation of diols and diacids (or derivatives thereof). In general, there are two types of polymers, i.e., aromatic polyesters and aliphatic polyesters. Exemplary aromatic polyesters include homopolymers or copolymers of poly(ethylene terephthalate) (PET or 2GT), polyacrylate, poly(trimethylene terephthalate) (PTT or 3GT), poly(ethylene isophthalate), poly(ethylene naphthalate), poly(butylene naphthalate), poly(butylene terephthalate) (PBT or 4GT). Exemplary aliphatic polyesters include homopolymers or copolymers of poly(hydroxyalkanoic acid) (PHA) (e.g., poly(lactic acid), poly(glycolic acid), poly(caprolactone), poly(trimethylene adipate, and poly(trimethylene) succinate). In one particular embodiment, the polyesters used here have a melting temperature of about 200° C. to about 300° C., or about 230° C. to about 270° C. In a further embodiment, the polyester films are PET films. In a yet further embodiment, the polyester films are bi-axially oriented PET films. The thickness of the polyester films may be in the range of about 0.5 to about 20 mils, or about 1 to about 18 mils, or about 2 to about 15 mils.

The poly(vinylidene chloride) composition used here may comprise a homopolymer of vinylidene chloride or a copolymer of vinylidene chloride with at least one other polymerizable vinyl or vinylidene compound.

The suitable vinyl or vinylidene compound used here has a general formula:

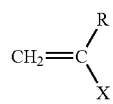

wherein,

R is —H, —COOR', —(CH$_2$)$_n$COOR' (n=1-5), an alkyl radical (e.g., methyl or ethyl radial), a halogen (e.g., Cl, Br, or F) and X is a hydrocarbon radical (e.g., methyl, phenyl, or naphthyl radical), a halogen (e.g., Cl, Br, or F), —NO, —NO$_2$, —CN, —COOR', —SO$_3$H, —CONH$_2$, —CONHR', —CONR'$_2$,

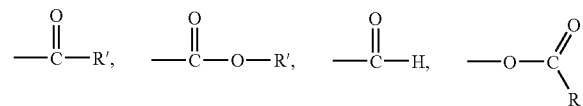

and ether radicals (e.g., —OR"); and
wherein
R' is an alkyl radical and R" is an alkyl or aryl radical.

Some specific examples of the suitable vinyl or vinylidene compounds include, but are not limited to, vinyl acetates; vinyl propionates; vinyl chloroacetates; vinyl chlorides; vinyl bromides; methyl or butyl acrylates; methyl, isobutyl, methoxyethyl, chloroethyl, or 2-nitro-2-methyl-propyl methacrylates; methyl or octyl α-chloroacrylates; methyl vinyl ketones; methyl isopropenyl ketones; itaconic acids; esters of itaconic acids; acrylonitriles; methacrylonitriles; styrenes; isobutylenes; vinyl naphthalenes; ethyl vinyl ethers; butyl vinyl ethers; N-vinyl phthalimides; N-vinyl succinimides; N-vinyl carbazoles; methylene diethyl malonates; and mixtures of two or more thereof.

In certain embodiments, the vinylidene chloride copolymer may comprise at least about 35 wt %, or at least about 50 wt %, or at least about 60 wt %, or at least about 75 wt %, or about 75 to about 95 wt %, of copolymerized residues of the vinylidene chloride, based on the total weight of the copolymer. For example, vinylidene chloride copolymers disclosed in U.S. Pat. Nos. 2,491,028; 2,627,088; 2,698,235; 2,698,240; and 3,143,421 may be used in the embodiments disclosed herein. More specific vinylidene chloride copolymers include, but are not limited to, vinylidene chloride/acrylonitrile copolymer, vinylidene chloride/vinylacetate copolymer, vinylidene chloride/styrene copolymer, vinylidene chloride/methyl methacrylate copolymer, vinylidene chloride/methacrylonitrile copolymer, vinylidene chloride/vinyl chloride copolymer, vinylidene chloride/isobutylene copolymer, vinylidene chloride/acrylic acid/itaconic acid copolymer, vinylidene chloride/acrylic ester/itaconic acid copolymer, vinylidene chloride/methylacrylate/itaconic acid copolymer, vinylidene chloride/mono methyl ester of itaconic acid copolymer, vinylidene chloride/mono ethyl ester of itaconic acid copolymer, vinylidene chloride/mono butyl ester of itaconic acid copolymer, and vinylidene chloride/acrylic acid/acrylonitrile copolymer.

Various processes for making such vinylidene chloride copolymers are well known in the art. For example, some suitable processes are described in U.S. Pat. Nos. 2,160,903; 2,160,931 to 2,160,943 (inclusive); 2,160,945; 2,160,946; and 2,160,947.

The poly(vinylidene chloride) composition may further include any other suitable additives. For example, the composition may incorporate about 0.1 to about 5 wt % of a dihydroxy compound, as disclosed in U.S. Pat. No. 3,143,421.

The poly(vinylidene chloride) composition may be applied to the surface of the polyester films by any suitable process. In certain embodiments, the coated polyester films are obtained by subbing the films into an aqueous or organic solvent dispersion of the poly(vinylidene chloride) composition. In one particular embodiment, as disclosed in U.S. Pat. No. 2,678,088, the polyester film is first coated with an aqueous dispersion of the poly(vinylidene chloride) composition and then the resultant film is oriented by stretching and other steps applied thereto such as heat setting. The procedure and apparatus for the coating of the polyester films with the poly(vinylidene chloride) compositions are not a limitation on the present disclosure and any of the usual coating apparatus and processing steps employed in the art may be employed to obtain the coated film product of the present disclosure.

The thickness of the poly(vinylidene chloride) layer may only be a fraction of the thickness of the polyester film. In one particular embodiment, the poly(vinylidene chloride) layer has a thickness of about 0.001 to about 10 μm, or about 0.01 to about 5 μm, or about 0.01 to about 2 μm.

Optionally, an organic colloid, such as a colloid of gelatin, glue, casein, albumen, poly(vinyl alcohol), is further applied over the poly(vinylidene chloride) coating followed by heat dry. In one embodiment, the organic colloid is an aqueous or organic solvent dispersion of gelatin, as disclosed in U.S. Pat. Nos. 2,491,028; 2,627,088; 2,698,235; 2,698,240; and 3,143,421. Such a gelatin layer may further comprise suitable additives, such as resorcinol, cyclohexanone, triacetin, glycerine, pentanediol, dimethoxy tetraethylene glycol, methoxy triglycol acetate, and mixtures thereof, as disclosed in U.S. Pat. No. 3,143,421. The resultant coated polyester film may have a gelatin layer with a thickness of about 0.001 to about 5 μm, or about 0.01 to about 5 μm, or about 0.01 to about 2 μm.

The abrasion resistant hardcoat used herein is a clear anti-scratch and anti-abrasion hardcoat, which may be formed of polysiloxanes, cross-linked (thermosetting) polyurethanes (such as those disclosed in U.S. Pat. No. 5,567,529 and U.S. Pat. No. 5,763,089), or oligomeric-based coatings (such as those disclosed in U.S. Pat. No. 7,294,401).

In one particular embodiment, the abrasion resistant hardcoat is derived from a polysiloxane coating composition made by hydrolyzing a tri-functional silane (e.g., methyltrimethoxysilane) in a mildly acidified colloidal silica solution, which forms the abrasion resistant hardcoat upon curing. The tri-functional silane used here has the general formula R'''Si(OR'''')$_3$, wherein —OR'''' is the functional group, and wherein R''' is selected from alkyl, vinyl, and aryl radicals and R'''' is selected from H and alkyl radicals having 1 to 4 carbons. In certain embodiments, R''' is selected from alkyl radicals having 1 to 4 carbons. In a further embodiment, about 60% of the R''' radicals, or about 80% to about 100% of the R''' radicals, is methyl. Suitable tri-functional silanes are well known within the art and readily available. For example, Z-6070, Z-6124, Z-6300, and Z-6518 silanes (Dow Corning Corporation, Midland, Mich.) and Silquest® A-162 and A-1630 silanes (Momentive Performance Materials, Wilton, Conn. (Momentive)) may be used in the invention. The polysiloxane based coating composition may further comprise a small amount of an epoxy-silane (e.g., γ-glycidoxypropyltrimethoxysilane) and/or an amino-silane (e.g., γ-aminopropyltrimethoxysilane) as doping agent(s) to further improve its adhesion to the substrate over which it is applied. The coating composition can be applied to the substrate polyester films by conventional methods, such as flowing, spraying, or dipping to form a continuous surface film. After sufficient drying, the coating composition can then be cured, e.g., at about 90° C. or higher for about 2 seconds or longer. The final polysiloxane based abrasion resistant hardcoat applied over the poly(vinylidene chloride) layer or the optional gelatin layer may have a thickness of up to about 100 μm, or about 0.5 to about 20 μm, or about 1 to about 5 μm, or about 1.5 to about 3 μm, or about 1.8 to about 2.8 μm.

Exemplary polysiloxane based coating compositions useful in the present disclosure and their application to the substrate films are disclosed in U.S. Pat. Nos. 3,986,997; 4,027,073, 4,177,315; 4,355,135; and 5,069,942, U.S. patent application Ser. No. 12/286,393, and European Patent No. EP0157030, which are incorporated herein by reference.

A layer of solar control material may be applied to at least one surface of the coated polyester film. Suitable solar control materials may be infrared absorbing materials, such as metal oxide nanoparticles (e.g., antimony tin oxide nanoparticles, indium tin oxide nanoparticles, or combinations thereof), metal boride nanoparticles (e.g., lanthanum hexaboride nanoparticles), or combinations thereof. Such materials may also be incorporated in any or all of the coating layers applied upon the polyester films. The polyester films may also be coated with an infrared energy reflective layer, such a metal layer, a Fabry-Perot type interference filter layer, a layer of liquid crystals, or combinations of two or more thereof.

In one embodiment, the hardcoated polyester film has both of its two surfaces coated with the poly(vinylidene chloride) layer and upon which the abrasion resistant hardcoat. In a further embodiment, the hardcoated polyester film has both of its two surfaces coated with the poly(vinylidene chloride) layer and upon which the organic colloids layer and upon which the abrasion resistant hardcoat. In a yet further embodiment, the hardcoated polyester film has both of its two surfaces coated with the poly(vinylidene chloride) layer and upon which the polysiloxane based abrasion resistant hardcoat. In a yet further embodiment, the hardcoated polyester film has both of its two surfaces coated with the poly(vinylidene chloride) layer and upon which the gelatin layer and upon which the polysiloxane based abrasion resistant hardcoat. In a yet further embodiment, the hardcoated polyester film has one of its two surfaces coated with the poly(vinylidene chloride) layer and upon which the abrasion resistant hardcoat. In a yet further embodiment, the hardcoated polyester film has one of its two surfaces coated with the poly(vinylidene chloride) layer and upon which the organic colloids layer and upon which the abrasion resistant hardcoat. In a yet further embodiment, the hardcoated polyester film has one of its two surfaces coated with the poly(vinylidene chloride) layer and upon which the polysiloxane based abrasion resistant hardcoat. In a yet further embodiment, the hardcoated polyester film has one of its two surfaces coated with the poly(vinylidene chloride) layer and upon which the gelatin layer and upon which the polysiloxane abrasion resistant hardcoat.

Further provided herein is a laminated article comprising at least one of the above described hardcoated polyester film. In such a laminated article, the hardcoated polyester film has one of its two surfaces (i.e., the outside surface, which is also one of the outer most surface of the laminated article) coated with (i) the poly(vinylidene chloride) layer and upon which the abrasion resistant hardcoat or (ii) the poly(vinylidene chloride) layer and upon which the organic colloids layer and upon which the abrasion resistant hardcoat. The lamination article disclosed herein further comprises at least one additional film or sheet layer laminated to the inside surface (i.e., the surface that is opposite from the hardcoat) of the hardcoated polyester film. By "laminated", it is meant that, within a laminated structure, the two layers are bonded either directly (i.e., without any additional material between the two layers) or indirectly (i.e., with additional material, such as interlayer or adhesive materials, between the two layers). The at least one additional film or sheet layer may be made of any material, including, but not limited to, glass, metals, polymers, and ceramics.

In one particular embodiment, the at least one additional film or sheet comprised in the laminated article is a polymeric sheet, which comprises a polymeric material selected from poly(vinyl acetal) (e.g., poly(vinyl butyral) (PVB)), poly(vinyl chloride), polyurethane, poly(ethylene vinyl acetate), acid copolymer of α-olefin and α,β-unsaturated carboxylic acid having from 3 to 8 carbon atoms, and ionomer made by partially or fully neutralizing acid copolymer of α-olefin and α,β-unsaturated carboxylic acid having from 3 to 8 carbon atoms, and combinations of two or more thereof. In a further embodiment, the at least one additional film or sheet layer is a poly(vinyl butyral) sheet.

The laminated article disclosed herein may also be a safety laminate comprising (a) a layer of the above described hardcoated polyester film, which has an outside surface that is coated with the poly(vinylidene chloride) layer and upon which the abrasion resistant hardcoat, (b) at least one polymeric interlayer sheet laminated to the inside surface of the hardcoated polyester film, and (c) a rigid sheet or an additional film layer further laminated to the at least one polymeric interlayer sheet. In further embodiment, the safety laminate may comprise (a) a layer of the above described hardcoated polyester film, which has an outside surface that is coated with the poly(vinylidene chloride) layer, upon which the organic colloid layer, and upon which the abrasion resistant hardcoat, (b) at least one polymeric interlayer sheet laminated to the inside surface of the hardcoated polyester film, and (c) a rigid sheet or an additional film layer further laminated to the at least one polymeric interlayer sheet. In a yet further embodiment, the safety laminate may comprise (a) a layer of the above described hardcoated polyester film, which has an outside surface that is coated with the poly(vinylidene chloride) layer and upon which the abrasion resistant hardcoat, (b) at least one polymeric interlayer sheet laminated to the inside surface of the hardcoated polyester film, (c) n layers of the rigid sheets or additional films which are interspaced by n−1 layers of additional polymeric interlayer sheets, wherein n is an integer of 1-10. In a yet further embodiment, the safety laminate may comprise (a) a layer of the above described hardcoated polyester film, which has an outside surface that is coated with the poly(vinylidene chloride) layer, upon which the organic colloid layer, and upon which the abrasion resistant hardcoat, (b) at least one polymeric interlayer sheet laminated to the inside surface of the hardcoated polyester film, and (c) n layers of the rigid sheets or additional films which are interspaced by n−1 layers of additional polymeric interlayer sheets, wherein n is an integer of 1-10.

The rigid sheets used here comprise a material with a modulus of about 100,000 psi (690 MPa) or greater (as measured by ASTM Method D-638). The rigid sheets used here may be formed of glass, metal, ceramic, or polymers including polycarbonate, acrylic, polyacrylate, cyclic polyolefin, metallocene-catalyzed polystyrene and combinations of two or more thereof. The term "glass" includes not only window glass, plate glass, silicate glass, sheet glass, low iron glass, tempered glass, tempered CeO-free glass, and float glass, but also colored glass, specialty glass (such as those containing ingredients to control solar heating), coated glass (such as those sputtered with metals (e.g., silver or indium tin oxide) for solar control purposes), low E-glass, Toroglas® glass (Saint-Gobain N.A. Inc., Trumbauersville, Pa.), Solexia® glass (PPG Industries, Pittsburgh, Pa.) and Starphire® glass (PPG Industries). Such specialty glasses are disclosed in, e.g., U.S. Pat. Nos. 4,615,989; 5,173,212; 5,264,286; 6,150,028; 6,340,646; 6,461,736; and 6,468,934. It is understood, however, that the type of glass to be selected for a particular module depends on the intended use.

The additional film layers used herein may be metal (such as aluminum foil) or polymeric. Polymeric film materials include, but are not limited to, polyesters (e.g., PET), poly (ethylene naphthalate), polycarbonate, polyolefins (e.g., polypropylene, polyethylene, and cyclic polyloefins), norbornene polymers, polystyrene (e.g., syndiotactic polystyrene), styrene-acrylate copolymers, acrylonitrile-styrene copolymers, polysulfones (e.g., polyethersulfone, and polysulfone), polyamides, polyurethanes, acrylic polymers, cellulose acetates (e.g., cellulose acetate and cellulose triacetates), cellophane, vinyl chloride polymers (e.g., polyvinylidene chloride and vinylidene chloride copolymers), fluoropolymers (e.g., polyvinyl fluoride, polyvinylidene fluoride, polytetrafluoroethylene, and ethylene-tetrafluoroethylene copolymers), and combinations of two or more thereof. When the additional polymeric film is located at the outside surface of the safety laminate, it may be further coated with the poly(vinylidene chloride) coating and upon which the abrasion resistant hardcoat, as disclosed above. In one particular embodiment, the additional film layer is a hardcoated polyester film as described above. In such an embodiment, it may be comprised of (a) a first polyester film (e.g., a PET film) having its outside surface coated with the poly(vinylidene chloride) layer and upon which the abrasion resistant hardcoat, (b) a polymeric interlayer sheet laminated to the uncoated inside surface of the first polyester film, and (c) a second polyester film (e.g., a PET film) having its uncoated inside surface laminated to the polymeric sheet and its outside surface coated with the poly(vinylidene chloride) layer and upon which that abrasion resistant hardcoat.

The polymeric interlayer sheets used here may be formed of any polymeric material, such as, poly(vinyl acetal) (e.g., poly(vinyl butyral) (PVB)), poly(vinyl chloride), polyurethane, poly(ethylene vinyl acetate), acid copolymer of α-olefin and α,β-unsaturated carboxylic acid having from 3 to 8 carbons, and ionomer made by partially or fully neutralizing acid copolymer of α-olefin and α,β-unsaturated carboxylic acid having from 3 to 8 carbons, or combinations of two or more thereof. In addition, when two or more polymeric sheets are incorporated in the safety laminate, the polymeric interlayer sheets may be formed of common or different polymeric materials.

The polymeric interlayer sheet may be in the form of a mono-layer sheet or a multi-layer sheet. When in the form of a multi-layer sheet, the individual sub-layers of the multi-layer polymeric interlayer may independently have any thickness. The polymeric interlayer sheet, as a whole, preferably has a total thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm).

The laminated articles disclosed here may be produced through any suitable lamination process. For example, in a conventional autoclave process, the component layers of the glazing laminates are stacked in the desired order to form a pre-lamination assembly. Typically, when one or both of the outer layers of the assembly are polymeric films, the pre-lamination assembly may further comprise a rigid cover plate placed over each of the polymeric films. The cover plates may be formed of glass or other suitable rigid materials. Optionally, the pre-lamination assembly may still further comprise a release liner placed between the polymeric film and the rigid cover plate to facilitate de-airing during the lamination process. The release liners used here may be formed of any suitable polymeric material, such as Teflon® films (DuPont) or polyolefin films. The assembly is then placed into a bag capable of sustaining a vacuum ("a vacuum bag"), the air is drawn out of the bag by a vacuum line or other means, the bag is sealed while the vacuum is maintained (e.g., about 27-28 inches Hg (689-711 mm Hg)), and the sealed bag is placed in an autoclave at a pressure of about 150 to about 250 psi (about 11.3-18.8 bar), a temperature of about 100° C. to about 180° C., or about 115° C. to about 160° C., or about 120° C. to about 160° C., or about 125° C. to about 155° C., for about 10 to about 50 minutes, or about 20 to about 45 minutes, or about 20 to about 40 minutes, or about 20 to about 35 minutes. A vacuum ring may be substituted for the vacuum bag. One type of suitable vacuum bag is disclosed within U.S. Pat. No. 3,311,517.

Alternatively, the pre-lamination assembly may be heated in an oven at about 80° C. to about 120° C., or about 90° C. to about 100° C., for about 20 to about 40 minutes, and thereafter, the heated assembly is passed through a set of nip rollers so that the air in the void spaces between the individual layers may be squeezed out, and the edge of the assembly sealed. The assembly at this stage is referred to as a pre-press.

The pre-press may then be placed in an air autoclave where the temperature is raised to about 100° C. to about 170° C., or about 115° C. to about 160° C., at a pressure of about 100 to about 300 psi (about 6.9 to about 20.7 bar), or about 200 psi (13.8 bar). These conditions are maintained for about 15 to about 60 minutes, or about 20 to about 50 minutes, and after which, the air is cooled while no more air is added to the autoclave. After about 20 to about 40 minutes of cooling, the excess air pressure is vented, the laminated products are removed from the autoclave and the cover plates and the release liners are removed from the final laminated article.

The laminated article may also be produced through non-autoclave processes. Such non-autoclave processes are disclosed, for example, within U.S. Pat. Nos. 3,234,062; 3,852,136; 4,341,576; 4,385,951; 4,398,979; 5,536,347; 5,853,516; 6,342,116; and 5,415,909, U.S. Pat. Appl No. 2004/0182493, European Pat. No. EP 1 235 683 B1, and PCT Pat. Appl. Nos. WO 91/01880 and WO 03/057478 A1. Generally, the non-autoclave processes include heating the pre-lamination assembly and the application of vacuum, pressure or both. For example, the assembly may be successively passed through heating ovens and nip rollers.

This should not be considered limiting. Essentially any lamination process may be used.

EXAMPLES

In each of the following examples (Comparative Examples CE1-CE3 and Examples E1 and E2), there was incorporated a PET film that was primed as follows
    CE1—a Melinex® 535 film (DuPont), which was a PET film primed on both sides with a crosslinked poly(allyl amine) coating;
    CE2—a Melinex® 505 film (Du Pont), which was a PET film primed on both sides with an acrylamide-doped acrylic hydrosol coating;

CE3—a Cronar® 733X film (Du Pont), which was a PET film primed on both sides with an hydroxyl-doped acrylic hydrosol coating;

E1—a poly(ethylene terephthalate) film primed on one side with a (polyvinylidene chloride) layer, as disclosed here above;

E2—a poly(ethylene terephthalate) film primed on one side with a poly(vinylidene chloride) layer and over which a gelatin layer, as disclosed above.

The various primed PET films were coated, on one side thereof, with a polysiloxane hardcoating (as disclosed in U.S. Pat. No. 5,415,942) followed by drying at room temperature. Each of the hardcoated films was than having its uncoated side laminated to a poly(vinyl butyral) sheet (Butacite® from DuPont) and further to a sheet of glass. The lamination process involved enclosing the assembly in an evacuated plastic vacuum bag and autoclaving the bagged assembly at 135° C. and 200 psi (13.8 bar) for 30 minutes. Further, Dow Betaprime® B5500 primer and over which two stripes of Dow Betaseal® U-400HV polyurethane beads (about ½ in (13 mm) apart with measurements of about ¼ in (6.4 mm) wide by about 3/16 in (4.8 mm) thick and about 6-8 in (152-203 mm) long) were applied on the hardcoat surface of each of the laminates and cured at room temperature for 10 days. The laminates were then subjected to adhesion test before and after H7Cataplasma (D47 1165-FH-7) exposure, wherein the Cataplasma exposure involved placing the laminates with water saturated cotton cloth in sealed plastic bags; keeping the bagged laminates in an oven for 7 days at 70° C.; further placing the laminate in a freezer for 2 hours at −20° C.; and finally letting the laminate dry at room temperature for about an hour before additional adhesion test. During the adhesion test, the laminate was secured to a bench or table for solid support; the strip of polyurethane beads was cut at one end parallel to the laminate surface and about 1/16 in (1.6 mm) from the laminate surface; the end "flap" created by the cut was grasped with a needle-nosed pliers; and a force was applied to peel the strip away from the laminate surface. If the strip was torn within itself (cohesive failure) with no separation between the polysiloxane hardcoat and the PET film it is considered 100% adhesion retention, and if the strip along with the polysiloxane hardcoat was peeled away from the PET film, it is considered adhesion failure or 0% adhesion retention. For each laminate sample, about 10 to 15 peel tests were conducted and the results were averaged to give a final averaged adhesion retention rate. For example, if all the peels were cohesive failure, the adhesion retention rate would be 100%, if half the peels were cohesive failure and half were adhesive failure, the adhesion retention rate would be 50%, and if all the tests were resulted to adhesive failure, the adhesion retention rate would be 0%. The adhesion testing results, reported in Table 1, demonstrates that the bond between the hardcoat and poly(ethylene terephthalate) film was very much improved when a poly(vinylidene chloride) layer is applied in between (E1 and E2).

TABLE 1

| Sample No. | Adhesion Retention Rate Before Cataplasma Exposure (%) | Adhesion Retention Rate After Cataplasma Exposure (%) |
|---|---|---|
| CE1 | 100 | 5 |
| CE2 | 100 | 0 |
| CE3 | 100 | 0 |
| E1 | 100 | 100 |
| E2 | 100 | 100 |

The invention claimed is:

1. A safety laminate consisting essentially of (a) a hardcoated poly(ethylene terephthalate) film consisting of a polyester film which has one surface coated with a layer of a poly(vinylidene chloride) composition, with an organic colloid applied over the poly(vinylidene chloride) composition and over which is an abrasion resistant hardcoat, and wherein the other surface of the polyester film is uncoated, (b) a polymeric interlayer sheet comprising a poly(vinyl butyral) or an ionomer laminated to the uncoated surface of the hardcoated poly(ethylene terephthalate) film, and (c) a glass sheet laminated to the polymeric interlayer sheet and opposite from the hardcoated poly(ethylene terephthalate) film.

2. The safety laminate of claim 1, wherein the polyester film is a poly(ethylene terephthalate) film.

3. The safety laminate of claim 1, wherein the poly(vinylidene chloride) composition comprises a homopolymer of vinylidene chloride or a copolymer of vinylidene chloride and at least one polymerizable vinyl or vinylidene compound having a formula of

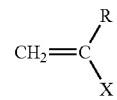

wherein, R is selected from the group consisting of —H, —COOR', —(CH$_2$)$_n$COOR' (n=1-5), an alkyl radical, a halogen and X is selected from the group consisting of a hydrocarbon radical, a halogen, —NO, —NO$_2$, —CN, —COOR', —SO$_3$H, —CONH$_2$, —CONHR', —CONR'$_2$,

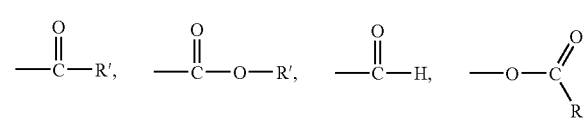

and —OR'',
and wherein R' is an alkyl radical and R'' is an alkyl or aryl radical.

4. The safety laminate of claim 1, wherein the poly(vinylidene chloride) composition comprises a vinylidene chloride copolymer, the vinylidene chloride copolymer comprising at least about 35 wt %, based on the total weight of the copolymer, of copolymerized units of a vinylidene chloride and copolymerized units of at least one vinyl or vinylidene compound selected from the group consisting of vinyl acetates; vinyl propionates; vinyl chloroacetates; vinyl chlorides; vinyl bromides; methyl or butyl acrylates; methyl, isobutyl, methoxyethyl, chloroethyl, or 2-nitro-2-methylpropyl methacrylates; methyl or octyl α-chloroacrylates; methyl vinyl ketones; methyl isopropenyl ketones; itaconic acids; esters of itaconic acids; acrylonitriles; methacrylonitriles; styrenes; isobutylenes; vinyl naphthalenes; ethyl vinyl ethers; butyl vinyl ethers; N-vinyl phthalimides; N-vinyl succinimides; N-vinyl carbazoles; methylene diethyl malonates; and mixtures of two or more thereof.

5. The safety laminate of claim 4, wherein the vinylidene chloride copolymer is selected from the group consisting of vinylidene chloride/acrylonitrile copolymer, vinylidene chloride/vinylacetate copolymer, vinylidene chloride/styrene copolymer, vinylidene chloride/methyl methacrylate copolymer, vinylidene chloride/metharylonitrile copolymer, vinylidene chloride/vinyl chloride copolymer, vinylidene chloride/isobutylene copolymer, vinylidene chloride/acrylic acid/itaconic acid copolymer, vinylidene chloride/acrylic ester/itaconic acid copolymer, vinylidene chloride/methylacrylate/itaconic acid copolymer, vinylidene chloride/mono methyl ester of itaconic acid copolymer, vinylidene chloride/mono ethyl ester of itaconic acid copolymer, vinylidene chloride/mono butyl ester of itaconic acid copolymer, and vinylidene chloride/acrylic acid/acrylonitrile copolymer.

6. The safety laminate of claim 1, wherein the abrasion resistant hardcoat is a polysiloxane based hardcoat.

7. The safety laminate of claim 1, wherein the organic colloid layer comprises a gelatin.

8. The safety laminate of claim 1, wherein the poly(vinylidene chloride) composition layer has a thickness of about 0.01 to about 5 μm.

9. The safety laminate of claim 1, wherein the organic colloid layer has a thickness of about 0.01 to about 5 μm.

10. The safety laminate of claim 1, wherein the interlayer sheet comprises the poly(vinyl butyral).

11. The safety laminate of claim 1, wherein (a) the polyester film is a poly(ethylene terephthalate) film, (b) wherein the poly(vinylidene chloride) composition comprises a vinylidene chloride copolymer, the vinylidene chloride copolymer comprising at least about 35 wt %, based on the total weight of the copolymer, of copolymerized units of a vinylidene chloride and copolymerized units of at least one vinyl or vinylidene compound selected from the group consisting of vinyl acetates; vinyl propionates; vinyl chloroacetates; vinyl chlorides; vinyl bromides; methyl or butyl acrylates; methyl, isobutyl, methoxyethyl, chloroethyl, or 2-nitro-2-methyl-propyl methacrylates; methyl or octyl α-chloroacrylates; methyl vinyl ketones; methyl isopropenyl ketones; itaconic acids; esters of itaconic acids; acrylonitriles; methacrylonitriles; styrenes; isobutylenes; vinyl naphthalenes; ethyl vinyl ethers; butyl vinyl ethers; N-vinyl phthalimides; N-vinyl succinimides; N-vinyl carbazoles; methylene diethyl malonates; and mixtures of two or more thereof, (c) the abrasion resistant hardcoat is a polysiloxane based hardcoat, (d) the organic colloid layer comprises a gelatin; (e) the poly(vinylidene chloride) composition layer has a thickness of about 0.01 to about 5 μm; and (f) the organic colloid layer has a thickness of about 0.01 to about 5 μm.

* * * * *